United States Patent [19]

Lipowitz et al.

[11] Patent Number: 4,472,556

[45] Date of Patent: Sep. 18, 1984

[54] METHOD FOR ENHANCING ONE OR MORE MECHANICAL PROPERTIES OF PARTIALLY CRYSTALLINE THERMOPLASTICS

[75] Inventors: Jonathan Lipowitz, Midland; Robert E. Kalinowski, Auburn, both of Mich.

[73] Assignee: Dow Corning Corporation, Midland, Mich.

[21] Appl. No.: 450,816

[22] Filed: Dec. 20, 1982

[51] Int. Cl.$^3$ .................... C08L 23/06; C08L 23/12; C08L 67/02
[52] U.S. Cl. .................... 525/106; 264/176 R; 264/176 F; 264/210.6; 264/211; 264/328.18; 525/100; 525/104; 525/393; 525/398; 525/431; 525/446; 525/464
[58] Field of Search .............. 264/176 R, 176 F, 300, 264/211, 328.18, 210.6; 525/100, 104, 393, 398, 431, 446, 464

[56] References Cited

U.S. PATENT DOCUMENTS

| | | |
|---|---|---|
| 3,087,908 | 4/1963 | Caird . |
| 3,253,506 | 5/1966 | Marks et al. . |
| 3,367,926 | 2/1968 | Voeks .................... 264/176 F |
| 3,639,378 | 2/1972 | DePierri et al. .................... 264/24 |
| 3,842,153 | 10/1974 | Owen et al. . |
| 4,287,108 | 9/1981 | Grigo et al. . |
| 4,411,854 | 10/1983 | Maurer et al. .................... 264/210.8 |

FOREIGN PATENT DOCUMENTS

| | | |
|---|---|---|
| 49-30873 | 3/1974 | Japan . |
| 1428331 | 3/1974 | United Kingdom . |

*Primary Examiner*—Philip Anderson
*Attorney, Agent, or Firm*—George A. Grindahl; Andrew H. Ward

[57] ABSTRACT

A method is disclosed for enhancing at least one of the mechanical properties of a partially crystalline thermoplastic by forming a dispersion of a polydiorganosiloxane within the thermoplastic, and extending the resultant dispersion. Ultimate tensile strength, modulus, and ultimate elongation can be enhanced in comparison with the same thermoplastic with no added polydiorganosiloxane and no extension.

17 Claims, No Drawings

METHOD FOR ENHANCING ONE OR MORE MECHANICAL PROPERTIES OF PARTIALLY CRYSTALLINE THERMOPLASTICS

BACKGROUND OF THE INVENTION

The present invention relates, in one aspect, to a method for enhancing at least one of the mechanical properties of a partially crystalline thermoplastic, by dispersing within said partially crystalline thermoplastic a polydiorganosiloxane of a particular description, and extending the resulting dispersion in a forming step. Ultimate tensile strength, ultimate elongation, and/or modulus can be increased in value by the method of the present invention. In another aspect, the present invention relates to thermoplastic articles having at least one enhanced mechanical property obtained through the method of the present invention.

One of the primary problems to which applied polymer science has addressed itself has been the problem of enhancing the mechanical properties of thermoplastic polymers. Efforts addressed to this problem have resulted in novel polymers, new fillers, new crosslinkers, and new methods of fabrication. These efforts have been productive. Whereas thirty years ago the term "plastic" was almost synonomous in the public mind with fragile, today certain thermoplastics can be confidently substituted for metals in many applications. The advantages gained in ease of fabrication, weight efficiency, and corrosion resistance are well known. However, there still exists a need to enhance the mechanical properties of thermoplastics, especially to enhance the mechanical properties of such thermoplastics as polyolefins and polyesters, which are less expensive, but also less strong than such exotic high strength thermoplastics as polyimides and the like.

Silicones of various descriptions have been incorporated into thermoplastic compositions for the purpose of modifying surface properties or bulk physical properties.

U.S. Pat. No. 3,087,908 discloses the incorporation of up to about 400 parts per million of organopolysiloxane into polycarbonates for the purpose of improving film-forming and fiber-forming properties. The resulting mixture of organopolysiloxane and polycarbonate can be fabricated into objects more free from surface physical abnormalities, such as craters, bubbles, and fisheyes, than objects fabricated of polycarbonate with no added organopolysiloxane.

U.K. Pat. No. 1,428,331 discloses the incorporation of either a polydiorganosiloxane, or an inert powder such as talc, into a thermoplastic polyester. The subsequent mixture was extended to 2.8 to 3.7 times its original longitudinal dimension. The extended mixture had a decreased coefficient of friction, and was incorporated in a laminate of two sheets. Said laminate was found to have enhanced adhesion between the sheets.

Japanese patent application No. 49-30873 discloses the preparation of polyethylene napthalate, and copolymers thereof, with a polydiorganosiloxane present in the reaction medium during a polycondensation reaction. The benefits conferred by the polydiorganosiloxane are disclosed as improved polymerization yield and superior molding properties. Fibers were spun from the product of the polycondensation reaction, and said fibers were drawn over a hot pin to an extension 4 times their original longitudinal dimension.

U.S. Pat. No. 3,842,153 discloses the use of certain organosilicon compounds to lower the melt viscosity of polypropylene by fostering degradation of the polypropylene.

U.S. Pat. No. 4,287,108 discloses the incorporation of certain polydiorganosiloxanes into polypropylene for the purpose of enhancing the elastic properties of the polypropylene. Specifically, said incorporation produces polypropylene articles having a lower value of permanent elongation than polypropylene with no polydiorganosiloxane incorporated therein.

U.S. Pat. No. 3,253,506 discloses the use of crosslinkable organosiloxane compositions to immobilize an extended linear organic polymer for the purpose of rendering more permanent an oriented matrix for a dichroic material.

While the references cited above disclose a variety of modifications to thermoplastics accomplished by incorporation of various silicones, said references rely on imparting to the thermoplastic polymer one or more of the recognized attributes of silicones, such as slipperiness, fluidity, surface smoothness, elasticity, ability to be crosslinked, and other properties commonly associated with silicones.

None of the references cited above disclose enhancement of the mechanical properties, such as ultimate tensile strength or modulus, of the thermoplastic into which the silicones were incorporated.

Enhancement of mechanical properties, as indicated by increases in ultimate tensile strength, and/or increases in stiffness, as indicated by increases in modulus, are not only unexpected upon incorporation of a liquid silicone in a solid thermoplastic, such increases are contrary to what would normally be expected when incorporating a liquid in a solid thermoplastic. Incorporating a liquid in a solid thermoplastic would normally be expected to result in a more rubbery composition, characterized by lower modulus and/or lower tensile strength. A well known example of incorporating a liquid in a solid thermoplastic is adding a plasticizer to a thermoplastic to render said thermoplastic softer and more rubbery.

BRIEF SUMMARY OF THE INVENTION

It is an object of the present invention to provide a method for producing partially crystalline thermoplastics having at least one enhanced mechanical property such as ultimate tensile strength or modulus. It is another object of the present invention to provide a method for producing partially crystalline thermoplastic polyolefins having at least one mechanical property enhanced. It is a further object of the present invention to provide a method for producing partially crystalline thermoplastic polyesters having at least one mechanical property enhanced.

These, and other objects which will be apparent to those skilled in the art upon consideration of the present specification and claims, are achieved by the method of the present invention, said method comprising forming a dispersion of a particular polydiorganosiloxane within a partially crystalline thermoplastic, and forming the resultant dispersion such that said dispersion is extended, in at least one dimension, a sufficient amount that at least one of the mechanical properties of the partially crystalline thermoplastic is enhanced.

The mechanical properties that have been enhanced by the method of the present invention include, but are not limited to, ultimate tensile strength, tensile modulus, and ultimate elongation. Those skilled in the art will recognize that similar enhancement would be expected in other mechanical properties, e.g. torsional modulus, flexural strength, secant modulus and the like.

DETAILED DESCRIPTION OF THE INVENTION

This invention relates to a method for enhancing at least one of the mechanical properties of a partially crystalline thermoplastic, said method comprising (A) making a dispersion within said partially crystalline thermoplastic of from about 0.1% to about 5% by weight, based on the total weight of the dispersion, of a polydiorganosiloxane, said polydiorganosiloxane having the formula $R_3SiO(R_2SiO)_xSiR_3$, wherein each R is selected from the group consisting of the methyl radical, carboxyalkyl radicals, trifluoropropyl radicals, aminoalkyl radicals, phenyl radicals and polyalkylene oxide radicals, wherein said polydiorganosiloxane has a viscosity value at 25° C. of from about $1.5 \times 10^{-2} m^2$/second to about $6.0 \times 10^{-1} m^2$/second, wherein the dispersed particles within said dispersion are, on average, less than about 1.5 μm in greatest dimension, and (B) forming the resultant dispersion such that said resultant dispersion is extended, in at least one dimension, to an extension ratio sufficient to enhance one of the mechanical properties of said partially crystalline thermoplastic, said forming being done at a temperature lower than the crystalline melting point of said partially crystalline thermoplastic.

This invention further relates to articles having at least one mechancial property, such as ultimate tensile strength, modulus or ultimate elongation, enhanced by the method of this invention.

The polydiorganosiloxanes used in the method of the present invention have the general formula $R_3SiO(R_2SiO)_xSiR_3$ wherein each R is selected from the group consisting of methyl radicals; carboxyalkyl radicals such as the —$CH_2CH_2SCH_2COOH$ radical, the —$CH_2OCH_2COOH$ radical, or the —$CH_2CH_2CH_2COOH$ radical; trifluoropropyl radicals; aminoalkyl radicals such as the —$CH_2CH_2CH_2NHCH_2CH_2NH_2$ radical or the —$CH_2CH_2CH_2NH_2$ radical; and polyalkylene oxide radicals such as polyethylene oxide radicals, polypropylene oxide radicals, or radicals consisting of copolymers of ethylene oxide and propylene oxide. Said polydiorganosiloxanes have a viscosity of from about $1.5 \times 10^{-2} m^2$/second (15,000 centistokes) to about $6.0 \times 10^{-1} m^2$/second (600,000 centistokes), at 25° C. The value of x is selected such that the viscosity of the polydiorganosiloxanes used in the method of this invention is within the above-stated viscosity limits. For example, x has a value of from about 600 to about 1600 in polymers wherein all of the R radicals are methyl radicals.

Preferred polydiorganosiloxanes for use in the method of the present invention are those polydiorganosiloxanes wherein at least 70%, on a molar basis, of the R radicals are methyl radicals.

The following polydiorganosiloxanes are exemplary of those useful in the method of the present invention; Me in the following list of examples represents the methyl radical:

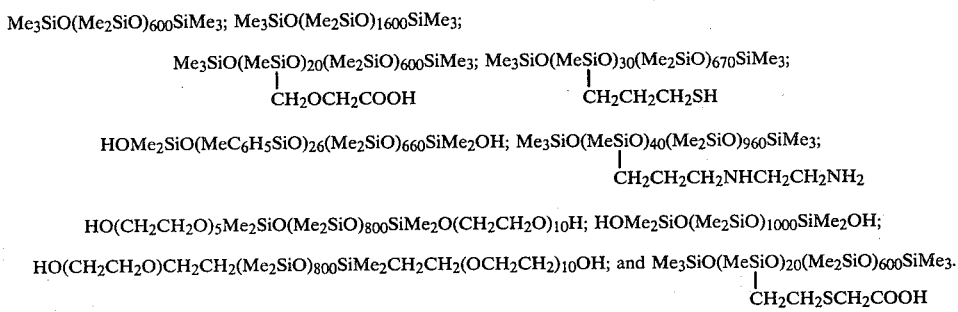

Polydiorganosiloxanes as hereinabove defined are well known; some are commercially available. Alternatively, said polydiorganosiloxanes can be synthesized by several known methods. By way of example, full or partial hydrolysis and subsequent condensation of appropriately selected silanes substituted with R radicals as hereinabove described, and also substituted with hydrolyzable radicals such as chlorine or alkoxy radicals, is a suitable synthetic method. A preferred method of synthesis for the polydiorganosiloxanes used in the method of the present invention is the acidic or basic equilibration of a suitable amount of trimethylsiloxy-endblocked polydimethylsiloxane with a suitable amount of dialkoxysilane such as represented by the formula $R_2Si(OCH_3)_2$, wherein each R is selected from the group of R radicals hereinabove set forth. Viscosity of the product can be controlled by appropriate selection of said polydimethylsiloxane.

Small amounts of hydroxyl radicals in the polydiorganosiloxane are not thought to affect the method of the present invention in any significant manner. For example, a polydiorganosiloxane within the recited viscosity range, having one or both ends substituted with single hydroxyl radicals is believed to be appropriate for use in the method of the present invention.

Small amounts of chain branching in the polydiorganosiloxane due to, for example, the presence of impurities during production of said polydiorganosiloxane, are not thought to adversely affect the efficacy of the method of the present invention.

The partially crystalline thermoplastics used in the method of the present invention are polymeric compositions comprising from about 5% to about 90% by weight of a polymeric crystalline phase and from about 95% to about 10% by weight of a polymeric amorphous phase.

Said partially crystalline thermoplastics are those organic polymers which can be shaped in a thermoplastic operation, i.e. said thermoplastic can be shaped into desired shapes by subjecting said thermoplastic to appropriate mechanical forces and appropriate elevated temperatures. Upon allowing or causing the temperature to return approximately to room temperature, and removing the mechanical forces, said desired shapes become substantially dimensionally stable in the absence of further elevated temperature or applied mechanical force. Such thermoplastic operations are well known, and include such operations as spinning and drawing a fiber, extrusion of a shape, extrusion and blowing of film, blowmolding, injection molding of articles, and solid phase pressure forming, wherein forming is accomplished at temperatures lower than those temperatures typical of normal forming operations, and at substantially higher forming pressures.

Examples of partially crystalline thermoplastics include polyolefins, such as polybutene, polychlorotrifluoroethylene, polyethylene, polypropylene and polymethylpentene; vinyl polymers, such as polyacrylonitrile, polyvinylidene chloride and polyvinylidene fluoride; polyoxides, such as polyoxymethylene and polyphenylene oxide; polysulfides, such as polyphenylene sulfide; polycarbonates, such as polyoxacarbonyloxy-1,4-phenyleneisopropylidene-1,4-phenylene, polyoxacarbonyloxy-1,4-phenylenethio-1,4-phenylene, and polyoxacarbonyloxy-1,4-phenylenemethylene-1,4-phenylene; polyesters, such as polyethylene terephtalate, polybutylene terephtalate, polyhexylene terephtalate, and polycyclohexyl dimethylol terephtalate; and polyamides, such as polyiminohexamethylene iminoadipoyl, polyiminohexamethylene iminosebacoyl, and polyimino-1-oxahexamethylene.

Preferred partially crystalline thermoplastics for use in the method of the present invention are polyesters, such as polyethylene terephtalate and polybutylene terephtalate; and polyolefins such as high density polyethylene, low density polyethylene, and polypropylene.

Partially crystalline thermoplastics are major items of commerce, and can be produced by well known procedures or purchased.

In the method of the present invention, from about 0.1% by weight to about 5% by weight, based on the total weight of the dispersion, of the polydiorganosiloxane is dispersed within the partially crystalline thermoplastic. More preferably, from about 0.1% to about 4% by weight, based on the total weight of the dispersion, of the polydiorganosiloxane is dispersed within the partially crystalline thermoplastic. Most preferably, from about 0.2% to about 2% by weight, based on the total weight of the dispersion, of the polydiorganosiloxane is dispersed within the partially crystalline thermoplastic.

In the method of the present invention, the polydiorganosiloxane is dispersed within the partially crystalline thermoplastic in particles less than about 1.5 μm in greatest dimension. By particles it is meant herein a volume within which the composition is predominantly polydiorganosiloxane. Small amounts, e.g. up to about 20%, of partially crystalline thermoplastic can be present within the particle.

A suitable dispersion of the polydiorganosiloxane component within the partially crystalline thermoplastic component can be made by subjecting a simple mixture of the two said components to suitable thermoplastic mixing means, in the well known manner.

A simple mixture of the two components can be prepared in a separate step by simple mechanical mixing, such as tumbling said two components together, or by forming a slurry of said two components with a suitable solvent for the polydiorganosiloxane and subsequently removing the solvent by evaporation or distillation. Examples of suitable solvents for the polydiorganosiloxane include aliphatic hydrocarbon solvents, such as pentane, hexane and heptane; aromatic hydrocarbon solvents, such as toluene and xylene; alcohol solvents, such as ethanol or isopropanol; ketones, such as acetone and methyl ethyl ketone; and other solvents for polydiorganosiloxanes well known to those skilled in the art.

Alternatively, the two components can be introduced into the suitable thermoplastic mixing means independently. If the two components are introduced independently, the order of addition is not critical.

Suitable thermoplastic mixing means for producing the suitable dispersion of the two components from the simple mixture of two said components are characterized by: means to substantially lower the viscosity of the partially crystalline thermoplastic; and means to impose mechanical shearing forces and mixing action upon the two said components.

Examples of equipment useful as suitable thermoplastic mixing means include: extruders, such as single screw and twin screw extruders; injection molding machines; mixers, such as heated mixers having meshing mixing cams, such as counterrotating cams to exert a kneading action upon the two said components; and other thermoplastic mixing means well known to those skilled in the art. Many such extruders, injection molding machines and mixers are designed with the specific object of promoting mixing action. Suitable thermoplastic mixing devices for the purposes of this invention are commercially available.

Thermoplastic mixing means wherein the viscosity of the partially crystalline thermoplastic is lowered by application of heat are highly preferred.

After it has been made, the dispersion of polydiorganosiloxane in partially crystalline thermoplastic is extendingly formed, in at least one dimension, at a temperature below the crystalline melting point of the partially crystalline thermoplastic.

Degree of extension is quantified herein by the term extension ratio. Extension ratio is defined herein as being a numerical value obtained by dividing the linear value of a dimension of the dispersion after extension in that dimension has been accomplished, by the linear value of that same dimension of the dispersion prior to the extension step. Thus, for example, if a fiber 1 cm in length is extended such that its extended length becomes 20 cm, the extension ratio is 20.

Extension can be in one dimension, such as length in the example above of a fiber, or in two dimensions, such as extending a sheet in both length and width.

Examples of one dimensional extension include drawing extruded shapes, such as fiber, film and tubing, or drawing shapes previously injection molded.

Examples of two dimensional extension include drawing, and simultaneous radial expansion, of an extruded tube, such as the process of extruding, drawing and simultaneously blowing film; blow molding, wherein a hollow shape is expanded to fill a mold; and the process of tentering, wherein a sheet is secured to a frame which is then expanded in two dimensions.

Extension ratio in the two dimensional case is determined in the manner hereinabove set forth. For example, if a tube is extruded with 1 m circumference at a rate of 1 cm/second and is extendingly formed such that the circumference is increased to 5 m and the tube is taken up at a rate of 5 cm/second, then the extension ratio in each dimension is 5.

In practicing the method of the present invention, the temperature of the dispersion of polydiorganosiloxane in the partially crystalline thermoplastic must be below the crystalline melting point of the partially crystalline thermoplastic during the extension step. Preferably, said extension step is conducted at a temperature of from 2° C. to 150° C. lower than the crystalline melting point of the partially crystalline thermoplastic. More preferably, said extension step is conducted at a temperature from 2° C. to 80° C. lower than the crystalline melting point of the partially crystalline thermoplastic. Most preferably, said extension step is conducted at a temperature from 2° C. to 50° C. lower than the crystalline melting point of the partially crystalline thermoplastic.

It is important that the temperature of the dispersion of polydiorganosiloxane in partially crystalline thermoplastic not be allowed to exceed the above temperature limitation through incidental heating, such as heating by frictional heating during the extension step.

Rate of extension is not narrowly critical, but should initially be at least 50% of the unextended dimension undergoing extension per minute. Thus an article having an initial unextended pertinent dimension 1 m in length should be formingly extended at an initial rate of at least 0.5 m/minute. The upper limit of rate of extension is determined by rupture of the dispersion during the extension step and is best determined experimentally.

Extension ratios resulting in enhancement of at least one of the mechanical properties of a partially crystalline thermoplastic vary with the specific chemical identify of said partially crystalline thermoplastic. For example, a dispersion wherein the partially crystalline thermoplastic is a polyolefin, such as polyethylene or polypropylene, requires an extension ratio of greater than about 10 for the enhancement of ultimate tensile strength and/or modulus by the method of the present invention. Dispersions wherein the partially crystalline thermoplastic is a polyester, such as polyethylene terephtalate or polybutylene terephtalate, require an extension ratio of greater than about 4.5 to exhibit said enhancement.

The minimum extension ratio necessary to provide enhancement of at least one of the mechanical properties of a given partially crystalline thermoplastic can be determined through routine experimentation. For example, a dispersion of polydiorganosiloxane in a given partially crystalline thermoplastic is prepared as hereinabove set forth. Said dispersion is fabricated into a number of suitable samples, which are then extended to an incrementally increasing set of extension ratios. These extended samples are tested for mechanical properties. Said minimum extension ratio will become apparent by correlating extension ratio with each mechanical property tested.

Thermoplastic forming equipment such as injection molders, blow molding machines, and extruders can be used, along with capstans, take up reels and the like, to implement the extension step as hereinabove described.

Other components commmonly added to partially crystalline thermoplastics per se can also be incorporated in the dispersions of polydiorganosiloxane in partially crystalline thermoplastics prior to the extension step of the method of the present invention. For example, colorants, antioxidants, ultraviolet light stabilizers, antistatic agents, antimicrobial compounds and the like can be incorporated in the dispersion. The incorporation of such components is within the scope of the method of the present invention.

The greatest dimension of a domain of polydiorganosiloxane dispersed in a partially crystalline thermoplastic prior to the extension step can be determined by microscopic observation, e.g. by optical microscopic examination or transmission electron microscopic examination of a suitably prepared sample.

The crystalline melting point of a given partially crystalline thermoplastic can be ascertained by reference to manufacturer's literature, or by reference to published tables of crystallographic data for polymers, such as tables found in: Polymer Handbook ed. Brandrup and Immergut, John Wiley and Sons, New York, 1975. Alternatively, the crystalline melting point of a partially crystalline thermoplastic can be determined by well known analytical techniques such as differential scanning calorimetry.

Articles obtained by the method of the present invention can be analyzed by appropriate techniques: the extension ratio that has been used in extendingly forming an article produced by the method of the present invention can be determined by slowly heating said article until it contracts, being careful not to exceed the crystalline melting temperature, and dividing the length of a dimension of said article before the heating step into the length of the same dimension of said article after said heating step. Heating must be continued until the contraction induced by said heating step has ceased.

The amount and type of polydiorganosiloxane in a given dispersion can be determined through routine extraction procedures with a solvent selected from the group of solvents for polydiorganosiloxanes as hereinabove set forth, with the proviso that said selected solvent not significantly dissolve the partially crystalline thermoplastic. Such a suitable solvent can be selected by consulting an appropriate reference, or can be determined through routine experimentation with the polydiorganosiloxane and thermoplastic.

Subsequently extracted polydiorganosiloxane can be analyzed in the following ways: the amount of polydiorganosiloxane present in the dispersion can be determined gravimetrically; the type and quantity of R radicals can be determined by standard methods such as infrared spectroscopy and nuclear magnetic resonance spectroscopy; and the molecular weight of the extracted polydiorganosiloxane can be determined by gel permeation chromatography. The viscosity of the extracted polydiorganosiloxane can be derived from the molecular weight using well known correlations. Alternatively, if sufficient extracted polydiorganosiloxane is available, viscosity can be determined directly using well known methods.

The amount of crystallinity of a partially crystalline thermoplastic can be determined by several well known techniques. For example, crystallinity can be determined by analysis of X-ray scattering data, by analysis of differential scanning calorimetry data, or in some cases, such as polyolefins of known chemical composition, the amount of crystallinity can be determined by measuring the density of the partially crystalline thermoplastic, and comparing said measured density to the density of known standards.

While not wishing to be limited by any particular theory, it is believed at the present time that the method of the present invention facilitates the rearrangement of crystal segments in a partially crystalline thermoplastic by a phenomenon that has been referred to as orientation. Such facilitation might, it is believed, lead to a more regular array of crystal segments than is attainable in the process of orientation practiced upon either per se partially crystalline thermoplastics or partially crystalline thermoplastics having conventional lubricants incorporated therein. For a discussion of orientation as practiced upon per se partially crystalline thermoplastics, see:

I. M. Ward, ed., "Structure and Properties of Oriented Polymers", Halsted Press, New York, 1975, Chapter 1, especially pp. 7–12.

The method of the present invention makes possible higher strength at the same extension ratio for a given partially crystalline thermoplastic than has heretofore been possible without special fillers or crosslinkers. For example, a polyester sample produced by the method of the present invention showed a 32% increase in ultimate tensile strength when compared to the same polyester per se extendingly formed in the same manner. By way of further example, a polyolefin sample produced by the method of the present invention showed a 40% increase in ultimate tensile strength when compared to the same polyolefin per se extendingly formed in the same manner.

The following examples of the invention are set forth for illustration of the invention, and are not to be construed as limiting. Parts and percentages are by weight except where otherwise indicated.

Viscosities reported herein were measured in centistokes at 25° C. and converted to m²/second by multiplying by $1.000 \times 10^{-6}$ m²/second/centistoke and rounding the result of said multiplication off to three significant figures. Mechanical properties reported herein were measured in pounds per square inch (psi), or percent elongation by the method of ASTM D638. Conversion to MPa from psi was accomplished by multiplying by $6.894 \times 10^{-3}$ MPa/psi, and rounding the result of said multiplication off to three significant figures, except for tensile modulus in Examples 50–81, wherein tensile modulus was measured by the method of ASTM D638, but rounded to two significant figures.

The following materials were used in the examples:

Polydiorganosiloxane A—trimethylsiloxyendblocked polydimethylsiloxane having a viscosity of $3.0 \times 10^{-2}$ m²/second.

Polydiorganosiloxane B—trimethylsiloxyendblocked polydimethylsiloxane having 3 mole % of the methyl groups replaced by mercaptopropyl groups, and having a viscosity of $2.3 \times 10^{-2}$ m²/second.

Polydiorganosiloxane C—trimethylsiloxyendblocked polydimethylsiloxane having 5 mole % of the methyl groups replaced by —$CH_2CH_2OCH_2COOH$ groups, and having a viscosity of $3.9 \times 10^{-2}$ m²/second Polydiorganosiloxane D—hydroxy-endblocked polydimethylsiloxane having 4.5 mole % of the methyl groups replaced by phenyl groups, and having a viscosity of $1.57 \times 10^{-2}$ m²/second.

Polydiorganosiloxane E—trimethylsiloxyendblocked polydimethylsiloxane having 4 mole % of the methyl groups replaced by —$CH_2CH_2CH_2NHCH_2CH_2NH_2$ groups, and having a viscosity of $4.08 \times 10^{-2}$ m²/second.

Polydiorganosiloxane F—The addition product of hydroxy-endblocked polydimethylsiloxane and polyethylene glycol, consisting of 70% polydimethylsiloxane and 30% polyethylene glycol. The viscosity of this addition product was $4.0 \times 10^{-2}$ m²/second.

Polydiorganosiloxane G—An addition product as described for polydiorganosiloxane F, having a slightly higher viscosity.

Polybutylene terephtalate—Valox 310, a product of General Electric Co., Pittsfield MA.

Polyethylene terephtalate—Tenite T-2, a product of Tennessee Eastman Co., Kingsport TN.

Polyethylene A—LP51.1, high density polyethylene, a product of Dow Chemical Co., Midland MI.

Polyethylene B—PE04350, a product of the Dow Chemical Co. of Midland MI.

Polypropylene—6523, fiber grade, a product of Hercules Inc., Taunton MA.

EXAMPLE 1

One hundred twenty-five g of polybutylene terephtalate pellets, 6.25 g of polydiorganosiloxane A, and 10 g of toluene were shaken together in a bottle of sufficient volume to allow simple mixture. The subsequent simple mixture was poured into a shallow pan. The pan filled with the above simple mixture was then placed in a vacuum oven. The toluene was removed from the simple mixture by heating the vacuum oven to a temperature of 80° C. and reducing the pressure in the vacuum oven to 133 Pa. The mixture remained for 1 hour in the oven under these conditions, resulting in said pellets becoming uniformly coated with polydiorganosiloxane A.

A dispersion was formed from the coated pellets via the mixing action of an injection molding machine. The uniformly coated pellets were loaded into the hopper of the injection molding machine, and the pellets were melted, mixed, and injected, under pressure, into a cooled mold, in the form of flat samples 3.2 mm thick. A 3.2 mm thick sample so obtained was mounted between the jaws of an Instron ® tensile testing machine, said jaws being enclosed within an oven set at 100° C.

After allowing sufficient time for the sample to come to thermal equilibrium with the 100° C. air in the oven, the jaws were separated at a rate of 500%/minute, and the resulting sample was extended to an extension ratio of 4.6.

The resulting extended sample was removed from the oven and allowed to cool to room temperature. Said extended sample was tested at room temperature for ultimate tensile properties in accordance with the procedure of ASTM D638, at a testing rate of 5.08 cm/min. Force and elongation at rupture were measured, and ultimate tensile strength was calculated on the basis of the cross-sectional area of the original, 3.2 mm thick injection molded sample. The results of this testing are set forth in Table I.

EXAMPLES 2–16

The procedure of Example 1 was repeated for polydiorganosiloxanes A,B,C,D,E, and F at various levels of addition. These levels, and the ultimate tensile properties measured upon extended dispersions of these levels of polydiorganosiloxanes in polybutylene terephtalate, are set forth in Table I.

A control sample was generated by following the procedure of Example 1, but omitting the polydiorganosiloxane addition. Results for this control sample are set forth in Table I.

The steps of Examples 1–16 were repeated except that the extension ratio was only 2.3. Ultimate tensile strength in this series was found to be significantly lower than the ultimate tensile strength of a control with no polydiorganosiloxane added when said control was extended to an extension ratio of 2.3. See Table II.

TABLE I

Polydiorganosiloxane Fluids in Polybutylene Terephtalate
Extension Ratio = 4.6

| Example | % Polydiorganosiloxane | Polydiorganosiloxane | Ultimate Tensile strength MPa | Ultimate Elongation, % |
|---|---|---|---|---|
| 1 | 0.5 | A | 41.0 | 1530 |
| 2 | 1.0 | A | 32.8 | 1310 |
| 3 | 2.5 | A | 32.4 | 1280 |
| 4 | 0.5 | B | 37.9 | 1380 |
| 5 | 2.5 | B | 37.9 | 1480 |
| 6 | 0.5 | C | 37.8 | 1375 |
| 7 | 1.0 | C | 35.7 | 1503 |
| 8 | 5.0 | C | 28.0 | 1100 |
| 9 | 0.5 | D | 28.6 | 1480 |
| 10 | 2.5 | D | 35.1 | 1393 |
| 11 | 0.5 | E | 37.9 | 1353 |
| 12 | 2.5 | E | 35.1 | 1375 |
| 13 | 0.5 | F | 36.7 | 1440 |
| 14 | 1.0 | F | 32.6 | 1225 |
| 15 | 0.5 | G | 38.6 | 1410 |
| 16 | 1.0 | G | 34.4 | 1349 |
| Control | 0 | — | 30.6 | 1250 |

TABLE II

Polydiorganosiloxane Fluids in Polybutylene Terephtalate
Extension Ratio = 2.3

| % Polydiorganosiloxane | Polydiorganosiloxane | Ultimate Tensile Strength MPa | Ultimate Elongation % |
|---|---|---|---|
| 0.5 | A | 30.8 | 159 |
| 1.0 | A | 30.7 | 96 |
| 2.5 | A | 30.1 | 30 |
| 1.0 | F | 29.9 | 60 |
| 0.5 | G | 31.9 | 126 |
| 1.0 | G | 29.6 | 32 |
| 0.5 | D | 31.9 | 104 |
| 2.5 | D | — | 22 |
| 0.5 | E | — | 24 |
| 1.0 | E | 33.3 | 24 |
| 2.5 | E | 32.0 | 34 |
| 0.5 | B | 33.2 | 226 |
| 1.0 | B | 32.2 | 246 |
| 2.5 | B | 32.2 | 67 |
| 0.0 | none | 33.8 | 183 |

EXAMPLES 17-25

The procedure of Example 1 was followed for various levels of polydiorganosiloxanes A, B and C, except that ultimate tensile properties were determined from pieces die cut from the extendingly formed samples. Ultimate tensile strength was calculated on the basis of the actual cross-sectional area of the extended sample rather than being calculated on the basis of the unextended sample as in examples 1–16. Results of this tensile testing are set forth in Table III. A control sample was generated by following the same procedure as examples 17–25 but omitting polydiorganosiloxane addition.

TABLE III

Polydiorganosiloxanes in Polybutyene Terephtalate
Extension Ratio = 4.6

| Example | % Polydiorganosiloxane | Polydiorganosiloxane | Tensile Modulus, MPa | Ultimate Tensile Strength, MPa | Ultimate Elongation, % |
|---|---|---|---|---|---|
| 17 | 0.5 | A | 705 | 164 | 55 |
| 18 | 1.0 | A | 702 | 151 | 48 |
| 19 | 2.5 | A | 655 | 152 | 50 |
| 20 | 0.5 | B | 570 | 153 | 51.4 |
| 21 | 1.0 | B | 503 | 154 | 54 |
| 22 | 2.5 | B | 564 | 153 | 47.3 |
| 23 | 0.5 | C | 558 | 153 | 48 |
| 24 | 1.0 | C | 518 | 158 | 48 |
| 25 | 5.0 | C | 667 | 125 | 38 |
| Control | 0 | — | 641 | 142 | 41.8 |

EXAMPLE 26

One hundred twenty-five g of polyethylene terephtalate pellets, 0.125 g of polydiorganosiloxane A, and 10 g of toluene were placed in a bottle of sufficient size to permit mixing, and shaken. The subsequent mixture was poured into a shallow pan and the toluene was removed by use of a vacuum oven as described in Example 1, resulting in uniformly coated pellets.

Dispersion of the polydiorganosiloxane was accomplished by the mixing action of a 1.9 cm, single-screw extruder. The coated pellets were placed in the hopper of said extruder, melted, and extruded at a screw speed of 50 r.p.m. The extruder had a temperature profile of: 245° C. in the first zone; 245° C. in the second zone; and 260° C. in the third and final zone.

The molten dispersion was extruded through a 3.2 mm circular die. The resulting extruded rod was cooled somewhat with a stream of nitrogen, and allowed to extend, under its own weight, a distance of 12.7 cm, to where the rod was collected in a bucket filled with cool water to which a small amount of surfactant had been added to facilitate sinking of the extruded rod.

The extruded, extended, and cooled rod was found to have a diameter of 0.3 mm on average, which indicates an extension ratio of about 117.

The ultimate tensile properties of the extruded, extended, and cooled rod were determined and calculated on the basis of the actual cross-sectional area of said extruded, extended and cooled rod.

The same procedure was followed for a control sample, with the polydiorganosiloxane addition omitted.

Example 26, prepared according to the method of the present invention, was found to have the following mechanical properties:
Ultimate tensile strength: 48 MPa
Ultimate elongation: 1098%
Tensile modulus: 145 MPa The control was similarly tested, and found to have the following mechanical properties:
Ultimate tensile strength: 33.8 MPa
Ultimate elongation: 774%
Tensile modulus: 231 MPa

EXAMPLE 27

The procedure of Example 26 was repeated with 1.25 g of polydiorganosiloxane A, which provided 1% by weight polydiorganosiloxane in the partially crystalline thermoplastic.

Ultimate tensile strength was found to be 44.5 MPa, ultimate elongation 1093%, and tensile modulus 249 MPa.

EXAMPLE 28-39

In these examples, the mixing and dispersion procedures of Example 1 were followed for various levels of polydiorganosiloxane A in polypropylene. The dispersions thus produced were extended by the procedure of Example 1 to various extension ratios at 125° C., at an extension rate of 500% per minute. Ultimate tensile properties were determined at room temperature and calculated on the basis of the cross-sectional area of the extended samples. Results are displayed in Table IV.

A control sample, following the same procedure set forth in this set of examples, but omitting the polydiorganosiloxane, was generated at each extension ratio. Results are displayed in Table IV.

TABLE IV

Polydiorganosiloxane A in Polypropylene

| Example | % A | Extension Ratio | Ultimate Tensile Strength, MPa | Ultimate Elongation, % |
|---|---|---|---|---|
| 28 | 0.1 | 5 | 201 | 66 |
| 29 | 0.5 | 5 | 207 | 53 |
| 30 | 1.0 | 5 | 218 | 61 |
| Control | 0 | 5 | 216 | 53 |
| 31 | 0.1 | 10 | 190 | 47 |
| 32 | 0.5 | 10 | 207 | 60 |
| 33 | 1.0 | 10 | 216 | 62 |
| Control | 0 | 10 | 202 | 58 |
| 34 | 0.1 | 20 | 217 | 58 |
| 35 | 0.5 | 20 | 206 | 57 |
| 36 | 1.0 | 20 | 224 | 58 |
| Control | 0 | 20 | 179 | 43 |
| 37 | 0.1 | 30 | 221 | 63 |
| 38 | 0.5 | 30 | 233 | 59 |
| 39 | 1.0 | 30 | 221 | 53 |
| Control | 0 | 30 | 235 | 42 |

EXAMPLES 40-48

The mixing, dispersion, and test procedures set forth in Example 1 were repeated for various levels of polydiorganosiloxane A in polyethylene B, and at various extension ratios. The samples were extendingly formed at a rate of 500% per minute, and a temperature of 110° C. The results of tensile testing are displayed in Tabel V.

Control samples, with no added polydioganosiloxane, were generated at each extension ratio. The results of tensile testing for the control samples are displayed in Table V.

TABLE V

Polydiorganosiloxane A in Polyethylene B

| Example | % A | Extension Ratio | Ultimate Tensile Strength MPa | Ultimate Elongation % |
|---|---|---|---|---|
| 40 | 0.1 | 5 | 134 | 56 |
| 41 | 0.5 | 5 | 156 | 64 |
| 42 | 1.0 | 5 | 151 | 53 |
| Control | 0 | 5 | 168 | 48 |
| 43 | 0.1 | 10 | 132 | 49 |
| 44 | 0.5 | 10 | 152 | 50 |
| 45 | 1.0 | 10 | 128 | 53 |
| Control | 0 | 10 | 143 | 47 |
| 46 | 0.1 | 20 | 155 | 60 |
| 47 | 0.5 | 20 | 143 | 56 |
| 48 | 1.0 | 20 | 137 | 51 |
| Control | 0 | 20 | 139 | 57 |

EXAMPLE 49

Polydiorganosiloxane A was dispersed in polyethylene A by mixing the two components in a Brabender ® Plasticorder ® in the ratio of 5 parts polydiorganosiloxane A to 95 parts polyethylene. The Plasticorder ® is a laboratory mixer comprising a heated mixing chamber and counterrotating cams. A dispersion of the polydiorganosiloxane in the polyethylene was formed by directly adding the two components to the mixing chamber and mixing said two components for 20 minutes at a temperature of 150° C. and at a mixing rate of 100 r.p.m. Upon completion of this step, the resultant dispersion was pressed into the form of a sheet in a compression mold at a temperature of 160° C. This sheet was held at 160° C. for 2 minutes, after which time the sheet was cooled to 110° C. at a cooling rate of 7° C./min. Upon attaining the temperature of 110° C., the sheet was rapidly cooled to a temperature of about 25° C.

In a series of experiments using samples die-cut from the sheet whose preparation is hereinabove described, the maximum extension ratio was determined. Each sample was extended, at a rate of 10 cm/min., until said sample ruptured.

Maximum extension ratios were found in this manner to be 44.75 at 95° C., and 38 at 105° C.

In a comparison set of experiments, the above procedure was followed with the substitution of paraffin oil, and oleic acid for the polydiorganosiloxane A of example 49.

The maximum extension ratio for the polyethylene having 5 parts of paraffin oil dispersed therein was found to be 33 at 95° C. and 33 at 105° C.

The maximum extension ratio for the polyethylene having 5 parts of oleic acid dispersed therein was found to be 36 at 95° C. and 31 at 105° C.

Paraffin oil and oleic acid are well known lubricants for polyethylene.

Polyethylene A per se tested by a different procedure was found to have a maximum extension ratio of 44.75 at 95° C., and 56.5 at 105° C. These values are not comparable to the values derived from Example 49 because the procedure in the case of per se polyethylene did not include mixing in the Plasticorder. The Plasticorder mixing conditions set forth above are believed to result in substantially lower extension ratios than extension ratios possible under milder mixing conditions, or no mixing.

EXAMPLES 50-81

Sheet samples of polyethylene A having 5 parts of polydiorganosiloxane A dispersed therein were prepared as set forth in Example 49. These sheet, samples were extended, at 95° C., to various extension ratios, and cooled to room temperature. The tensile modulus of each cooled sample was determined and is displayed in Table VI.

The above procedure was used to generate data for comparison samples of polyethylene A having dispersed therein 5 parts of paraffin oil and 5 parts of oleic acid respectively per 95 parts of polyethylene. These results are also displayed in Table VI.

TABLE VI

Extension Ratios vs. Tensile Modulus

5% Polydiorganosiloxane A in Polyethylene

| Tensile Modulus, | | Extension |

TABLE VI-continued

Extension Ratios vs. Tensile Modulus

| Example | MPa | Ratio |
| --- | --- | --- |
| 50 | 48 | 42 |
| 51 | 43 | 43 |
| 52 | 43 | 41 |
| 53 | 41 | 40 |
| 54 | 38 | 40 |
| 55 | 36 | 39 |
| 56 | 38 | 39 |
| 57 | 39 | 39 |
| 58 | 39 | 38 |
| 59 | 38 | 38 |
| 60 | 38 | 37 |
| 61 | 34 | 37 |
| 62 | 37 | 36 |
| 63 | 51 | 35.5 |
| 64 | 46 | 35.5 |
| 65 | 33 | 35 |
| 66 | 36 | 35 |
| 67 | 37 | 35 |
| 68 | 34 | 34 |
| 69 | 36 | 34 |
| 70 | 38 | 34 |
| 71 | 46 | 34 |
| 72 | 42 | 33 |
| 73 | 34 | 32 |
| 74 | 36 | 32 |
| 75 | 32 | 31.5 |
| 76 | 34 | 31.5 |
| 77 | 38 | 31.5 |
| 78 | 25 | 30 |
| 79 | 31 | 30 |
| 80 | 40 | 30 |
| 81 | 43 | 24 |

5% Paraffin Oil in Polyethylene

| Tensile Modulus MPa | Extension Ratio | Tensile Modulus, MPa | Extension Ratio |
| --- | --- | --- | --- |
| 33 | 31 | 30 | 28 |
| 33 | 29 | 32 | 27 |
| 31 | 29 | 24 | 26 |
| 30 | 29 | 32 | 25 |
| 29 | 28.5 | 27 | 24 |
| 31 | 28.5 | 24 | 23 |
| 33 | 28.5 | 24 | 21 |
| 35 | 28.5 | 22 | 20 |

5% Oleic Acid in Polyethylene

| Tensile Modulus MPa | Extension Ratio | Tensile Modulus, MPa | Extension Ratio |
| --- | --- | --- | --- |
| 26 | 35 | 30 | 26.5 |
| 18 | 32 | 19 | 25 |
| 27 | 31 | 24 | 25 |
| 30 | 31 | 23 | 23.5 |
| 23 | 30 | 26 | 22.5 |
| 33 | 30 | 23 | 19.5 |
| 34 | 30 | 22 | 19 |
| 32 | 28 | 16 | 18 |
| 30 | 26.5 | | |

That which is claimed is:

1. A method for enhancing at least one of the mechanical properties of a partially crystalline thermoplastic, said method comprising (A) making a dispersion within said partially crystalline thermoplastic of from about 0.1% to about 5% by weight, based on the total weight of the dispersion, of a polydiorganosiloxane, said polydiorganosiloxane having the formula $R_3SiO(R_2SiO)_xSiR_3$, wherein each R is selected from the group consisting of the methyl radical, carboxyalkyl radicals, trifluoropropyl radicals, aminoalkyl radicals, phenyl radicals and polyalkylene oxide radicals, wherein said polydiorganosiloxane has a viscosity value at 25° C. of from about $1.5 \times 10^{-2}$ m$^2$/second to about $6.0 \times 10^{-1}$ m$^2$/second, wherein the dispersed particles within said dispersion are, on average, less than about 1.5μm in greatest dimension, and (B) forming the resultant dispersion into a shaped article such that said resultant dispersion is extended during the forming step, in at least one dimension, to an extension ratio sufficient to enhance one of the mechanical properties of said partially crystalline thermoplastic, said forming being done at a temperature lower than the crystalline melting point of said partially crystalline thermoplastic.

2. The method of claim 1 wherein the forming step comprises spinning and subsequently drawing a fiber.

3. The method of claim 1 wherein the forming step comprises blow molding.

4. The method of claim 1 wherein the forming step comprises extruding and blowing a film.

5. The method of claim 1 wherein the forming step comprises solid phase pressure forming.

6. The method of claim 1 wherein the partially crystalline thermoplastic is a partially crystalline polyolefin and the extension ratio is greater than about 10.

7. The method of claim 6 wherein the polyolefin is polyethylene.

8. The method of claim 6 wherein the polyolefin is polypropylene.

9. The method of claim 1 wherein the partially crystalline thermoplastic is a polyester and the extension ratio is greater than about 4.5.

10. The method of claim 9 wherein the polyester is polyethylene terephtalate.

11. The method of claim 9 wherein the polyester is polybutylene terephtalate.

12. The method of claim 1 wherein R represents the methyl radical.

13. The method of claim 6 wherein R represents the methyl radical.

14. The method of claim 9 wherein R represents the methyl radical.

15. An article produced by the method of claim 1.

16. An article produced by the method of claim 6.

17. An article produced by the method of claim 9.

* * * * *